United States Patent
Thekkath et al.

(10) Patent No.: US 6,490,642 B1
(45) Date of Patent: *Dec. 3, 2002

(54) LOCKED READ/WRITE ON SEPARATE ADDRESS/DATA BUS USING WRITE BARRIER

(75) Inventors: Radhika Thekkath, Palo Alto; G. Michael Uhler, Redwood City, both of CA (US)

(73) Assignee: MIPS Technologies, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,092

(22) Filed: Aug. 12, 1999

(51) Int. Cl.[7] .......................... G06F 13/00; G06F 13/40
(52) U.S. Cl. ..................... 710/110; 710/108; 711/151
(58) Field of Search ............................... 710/5, 6, 200, 710/110, 107, 305, 310, 113, 240, 108; 711/1, 163, 211, 100, 155; 714/773; 712/17; 365/221; 370/402, 464

(56) References Cited

U.S. PATENT DOCUMENTS

| | | | | |
|---|---|---|---|---|
| 4,587,609 A | * | 5/1986 | Boudreau et al. | |
| 4,998,198 A | | 3/1991 | Chan | |
| 5,091,846 A | | 2/1992 | Sachs et al. | |
| 5,255,378 A | | 10/1993 | Crawford et al. | |
| 5,428,753 A | | 6/1995 | Kondo et al. | |
| 5,463,762 A | | 10/1995 | Morrissey | |
| 5,504,874 A | | 4/1996 | Galles | |
| 5,525,971 A | | 6/1996 | Flynn | |
| 5,579,530 A | | 11/1996 | Solomon et al. | |
| 5,581,782 A | | 12/1996 | Sarangdhar et al. | ........ 395/800 |
| 5,615,404 A | | 3/1997 | Knoll et al. | ................ 395/882 |
| 5,696,976 A | | 12/1997 | Nizar et al. | ................. 395/739 |
| 5,751,975 A | | 5/1998 | Gillespie et al. | ............ 395/306 |
| 5,768,612 A | | 6/1998 | Nelson | ........................ 395/800 |
| 5,778,412 A | | 7/1998 | Gafken | ........................... 711/5 |
| 5,781,745 A | | 7/1998 | Ramelson | |
| 5,787,486 A | * | 7/1998 | Chin et al. | |
| 5,796,977 A | | 8/1998 | Sarangdhar | ................. 395/406 |
| 5,799,203 A | | 8/1998 | Lee et al. | |
| 5,828,865 A | | 10/1998 | Bell | ........................... 395/500 |
| 5,832,310 A | | 11/1998 | Morrissey et al. | |
| 5,859,986 A | | 1/1999 | Marenin | |
| 5,892,978 A | | 4/1999 | Munguia et al. | |
| 5,918,072 A | | 6/1999 | Bhattacharya | |
| 5,996,036 A | | 11/1999 | Kelly | |
| 6,035,364 A | | 3/2000 | Lambrecht et al. | |
| 6,044,225 A | | 3/2000 | Spencer et al. | |
| 6,085,261 A | | 7/2000 | McIntyre, Jr. et al. | |
| 6,122,690 A | | 9/2000 | Nannetti | |

(List continued on next page.)

Primary Examiner—Gopal C. Ray
(74) Attorney, Agent, or Firm—Richard K. Huffman; James W. Huffman

(57) ABSTRACT

An apparatus is presented for improving the efficiency of data transfers between devices interconnected over an on-chip system bus a multi-master computer system configuration. Bus efficiency is improved by providing an apparatus for controlling a read-modify-write transaction to an address in a bus slave device that does not suspend essential features of the system bus during the transaction, namely, pipelining and transaction splitting. The apparatus includes transaction control logic in a bus master device and transaction response logic in a bus slave device. The transaction control logic provides a write barrier command from the bus master device over the on-chip system bus to the bus slave device. The transaction response logic receives the write barrier command, and precludes execution of future transactions to the address within the bus slave device until completion of the read-modify-write transaction while allowing execution of transactions to other addresses within the bus slave device to complete.

25 Claims, 8 Drawing Sheets

U.S. PATENT DOCUMENTS 6,134,481 A      10/2000  Warren
6,138,176 A   *  10/2000  McDonald et al.
6,108,734 A      11/2000  Shand
6,173,349 B1      1/2001  Qureshi et al.
6,185,637 B1      2/2001  Strongin et al.
6,301,625 B1  *  10/2001  McDonald et al.
6,321,284 B1     11/2001  Shionohara et al.

* cited by examiner

*Multiple Master System Bus Configuration*

*Pipelined and Split-Transactions Over System Bus*

Read-Modify-Write Scenario

*Apparatus for Locked RMW Using Write Barrier*

*Bus Arbiter Detail*

*Bus Slave Detail*

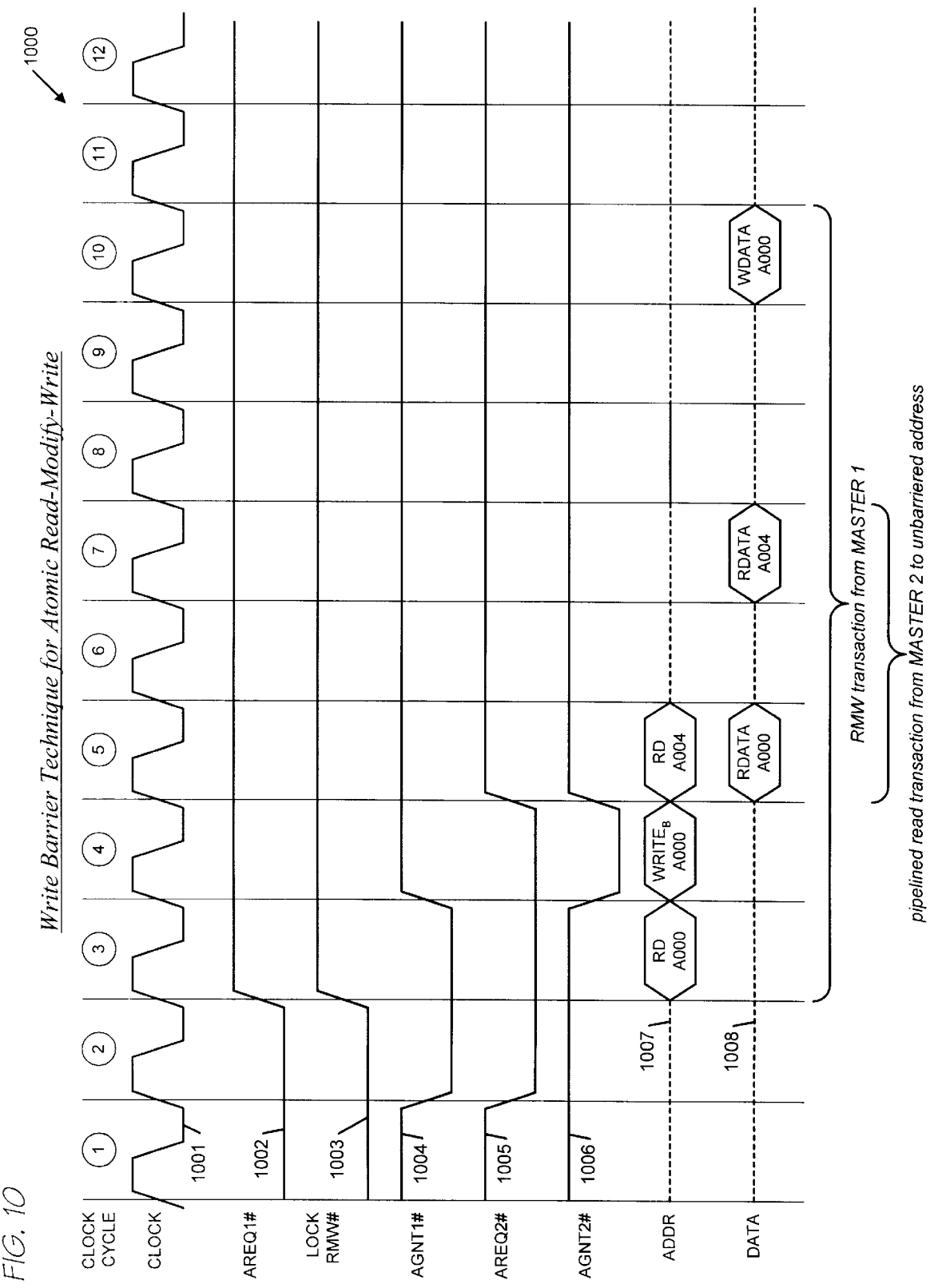

LOCKED READ/WRITE ON SEPARATE ADDRESS/DATA BUS USING WRITE BARRIER

CROSS REFERENCE TO RELATED APPLICATIONS

This application is related to the following U.S. Patent applications, having a common filing date and a common assignee. Each of these applications is hereby incorporated by reference in its entirety for all purposes:

BACKGROUND OF THE INVENTION

| Docket # | Title |
| --- | --- |
| MIPS: 19427A-007300, U.S. patent application Ser. No. 09/373,091. | SCALABLE ON-CHIP SYSTEM BUS |
| MIPS: 19427A-009400, U.S. patent application Ser. No. 09/373,094. | COHERENT DATA APPARATUS FOR AN ON-CHIP SPLIT TRANSACTION SYSTEM BUS |
| MIPS: 19427A-009500, U.S. patent application Ser. No. 09/373,093. | DATA RELEASE TO REDUCE LATENCY IN ON-CHIP SYSTEM BUS |
| MIPS: 19427A-009600, U.S. patent application Ser. No. 09/373,095. | BURST-CONFIGURABLE DATA BUS |

FIELD OF THE INVENTION

This invention relates in general to the field of computer system bus architecture, and more particularly to is an apparatus that allows atomic read-modify-write operations to be executed over a pipelined, split-transaction on-chip data bus.

DESCRIPTION OF THE RELATED ART

Computer systems have historically consisted of a number of distinct components such as a central processing unit (CPU), a memory, and input/output (I/O) logic. The CPU performs all of the computational functions, the memory stores program instructions and data that direct the CPU to perform specific functions, and the I/O logic provides an interface to devices such as video monitors, keyboards, and storage devices. The CPU must constantly transfer data to/from the memory to retrieve program instructions and to store results of computations. The CPU must also communicate with the I/O logic to retrieve commands and to display results. In many systems today, the I/O logic directly retrieves large blocks of data from the memory to allow video monitors to be refreshed without burdening the CPU.

To standardize interface signals, interface logic, and the communication protocol between devices in a computer system, it is standard practice to interconnect all devices via a bused architecture rather than providing point-to-point connections between devices. In a bused architecture, a common set of communication signals-a system bus consisting of address signals and data signals are connected in parallel to all devices. The address signals on the system bus identify a device that is the target of a data transfer. The data signals on the system bus are used to transfer the data itself to the target device.

And because devices in the system configuration are connected in parallel to the system bus, it follows that only one instance of a data transfer can occur at any given point in time. If two devices execute a data transfer at the same time, then signals on the bus are corrupted, thus precluding any transfer of data at all. As a result, system designers provide logic elements in a system configuration whose purpose is to arbitrate access to the bus so that contention is avoided and devices are provided fair and timely access to the bus.

In early years, computer system buses were simple: eight bits in width, the CPU was the only device that was capable of initiating a data transfer, and the number of other devices connected to the bus consisted primarily of memory and I/O logic. Accordingly, access to the bus was easily managed. If the CPU required a byte of data from the memory, it grabbed the bus, issued the address of the data byte to the memory, and the memory supplied the byte of data to the CPU. Operation of the bus was efficient because the bus was always available for use by the CPU.

But in more recent years, a host of associated technological advances have completely changed the bus architecture. Because a digital computer can be used to control a wide range of automated processes, whole industries have migrated toward the incorporation of computers into their products. Today we see computer systems in telecommunication devices, televisions, home appliances, automobiles, industrial process controllers, musical instruments, games, and vending machines, not to mention aircraft, spacecraft, weapons systems, and data network servers. It could be said that it is the demand for faster, more precise, more application-specific, more robust computer systems that is driving the computer industry toward further advances instead of advances in the industry identifying opportunities for application of computer devices. We are experiencing an era where demands are pulling enabling technologies along.

Today, there are literally thousands of different devices that can be connected to a computer bus. Today's data buses are no longer 8 bits wide; 64-bit buses are more commonly found with new devices coming to the field having 128-bit buses, or wider. And today's systems no longer have only one device that is capable of initiating a transaction over the data bus. A high-end performance computer may have a CPU that is dedicated to performing general purpose computations, a graphics processor that performs video-intensive computations, and a digital signal processor (DSP) that performs intensive audio signal manipulations. The high-end system may also have a communications processor that is dedicated to interacting with other computers over a network. All of these processors must communicate over a system bus to memory, to I/O logic, to each other, and to innumerable other kinds of special-purpose devices. In fact, it is not uncommon today to find four or more CPUs in a system configuration, each of which is capable of initiating data transfer operations over the system bus. Because of these advances in the art, system designers have been forced to provide more sophisticated techniques and algorithms that enable a system bus to be used more efficiently.

One such technique is known as transaction pipelining. Simply put, rather than executing a first address transaction over the address signals and a first data transaction over the data signals to accomplish a first data transfer operation, then following this with a second address transaction over the address signals and a second data transaction over the data signals to accomplish a second data transfer operation, pipelining allows transactions over both sets of signals to occur simultaneously, very much like an assembly line process. In the case stated above, pipelining allows the second address transaction to occur over the address signals concurrent with execution of the first data transaction. Obviously, rather than arbitrating access to the bus at a system level, devices that support pipelined bus arbitrate access at the address and data signal level distinctly. A device can be granted access to the address signals while a different device is granted access to the data signals.

A second technique that has been developed to improve the efficiency of data transfers over a system bus is transaction splitting. A transaction is typically defined as a read or a write, to or from, memory or I/O. The transaction begins with an address phase that defines the type of transaction, and the address of the data, and concludes with a data phase where the data associated with the address is presented to/from the requester. In a split transaction system, the address and data phases of a transaction are split. That is, the address phase of a transaction is decoupled from the data phase of a transaction. This allows the address bus to be utilized for subsequent transactions, even though the data bus is still completing an initial transaction.

Furthermore, a split-transaction bus allows data transactions to occur out-of-order. What this means is that devices that are capable of providing data more rapidly can access the data bus-which would otherwise be idle-ahead of slower devices, even though address transactions to the slower devices preceded address transactions to the faster devices (presuming some form of transaction tracking is provided). The addition of transaction splitting to a pipelined architecture significantly improves the usage efficiency of a system bus.

Both pipelining and transaction splitting are essential features of a present day system bus where the demand for access is heavy and the amount of data transferred is large. Yet in spite of the necessity of these features, there is one class of data transfer operations that cannot be efficiently executed in a pipelined, split-transaction environment: read-modify-write operations.

A read-modify-write operation, generally speaking, is a series of two dependent data transfers to the same location: a first data transfer wherein the contents of the location are read by a requesting device and a second data transfer wherein the requesting device writes new data to the location. Read-modify-writes are commonly employed in a system configuration that provides shared resources to multiple CPUs. Most often, the availability of a resource is indicated by the state of a location, say, an address in memory. If the contents of the addressed location are, say all zeros, then the resource is not being used. If the contents are all ones, then the resource is in use. Hence, to acquire and use the resource, a given CPU will read the address. The CPU has acquired the resource if it just read in all zeroes. If it read in ones, then it has to wait until the current owner relinquishes control by writing zeroes. Irrespective of whether the CPU read zeroes or ones, it writes back ones. Note that if the CPU became the owner, this is the correction modification to the location. If the CPU is not the owner, then this write has no impact.

But to properly perform a read-modify-write operation, the memory location must be protected from inadvertent accesses by other CPUs during the interim between the read by the given CPU and the ensuing write. Otherwise, another CPU may be allowed to think that it can also obtain the resource.

But present day bus architectures only provide workaround approaches to enable read-modify-writes to be accomplished. One approach, bus locking, suspends pipelining and transaction-splitting features altogether during a read-modify-write while another approach, address reservation, requires that the requesting device be responsible for ensuring that the write portion of the read-modify-write operation is performed, when in fact the requesting device cannot prevent any other device from writing to the address in the interim; the requesting device is at the mercy of the bus and may very well experience problems because of the unpredictable latency of the write.

Therefore, what is needed is an apparatus for performing a read-modify-write operation that preserves both pipelining and split-transaction features of a system bus during execution of the operation.

In addition, what is needed is a system bus apparatus that enables read-modify-write operations to be executed with certainty within a pipelined, split-transaction environment.

SUMMARY

To address the above-detailed deficiencies, it is an object of the present invention to provide an apparatus for performing a read-modify-write operation over a system bus that does not require suspension of either pipelining or transaction splitting.

Accordingly, in the attainment of the aforementioned object, it is a feature of the present invention to provide an apparatus for controlling a read-modify-write transaction to an address in a bus slave device. The apparatus includes transaction control logic and transaction response logic. The transaction control logic provides a write barrier command from a bus master device over an on-chip system bus to the bus slave device. The transaction response logic is coupled to the transaction control logic. The transaction response logic receives the write barrier command and precludes execution of any other transaction to the address within the bus slave device until completion of the read-modify-write transaction while simultaneously allowing execution of other transactions to other addresses within the bus slave device.

An advantage of the present invention is that other transactions can occur over a system bus during the interim between the read portion and the write portion of a read-modify-write operation.

Another object of the present invention is to provide a system bus apparatus that can perform a write portion of a read-modify-write operation without being required to ensure that other devices have not perturbed the target address of the write in the interim.

In another aspect, it is a feature of the present invention to provide a computer system bus apparatus for executing a read-modify-write transaction to an address within a bus slave device. The computer system bus apparatus has a bus master device and write barrier logic. The bus master device requests the read-modify-write transaction. The bus master device includes an arbitration signal generator and command generation logic. The arbitration signal generator indicates to an address bus arbiter an intent to perform the read-modify-write operation. The command generation logic is coupled to the arbitration signal generator. The command generation logic issues, over an address bus, a read command to the address followed immediately by a write barrier command to the address. The write barrier logic is coupled to the bus master device. The write barrier logic receives the read command and the write barrier command, and prevents reads/writes from/to the address until data corresponding to the read-modify-write transaction is written to the address while simultaneously allowing reads/writes from/to other addresses within the bus slave device.

Another advantage of the present invention is that a system bus is not encumbered with unnecessary retries to accomplish a write portion of a read-modify-write.

In a further aspect, it is a feature of the present invention to provide a computer program product for use in designing, simulating, fabricating, or testing an integrated circuit device. The computer program product includes a storage medium. The storage medium has computer readable instructions embodied thereon, for causing a computer upon which the computer readable instructions are executed to describe the integrated circuit device such that it can be modified, simulated, fabricated, or tested. The computer readable instructions include first instructions and second instructions. The first instructions cause the computer to describe transaction control logic, where the transaction control logic provides a write barrier command from a bus master device over an address bus to a bus slave device. The second instructions cause the computer to describe transaction response logic, where, upon receipt of the write barrier command, the transaction response logic precludes reads or writes to an address within the bus slave device until data, provided over a separate data bus, corresponding to the write barrier command is written into the address, and where the transaction response logic simultaneously allows the execution of reads/writes to other addresses within the bus slave device.

A further advantage of the present invention is that its utilization improves the efficiency at which a system bus transfers data between devices.

BRIEF DESCRIPTION OF THE DRAWINGS

These and other objects, features, and advantages of the present invention will become better understood with regard to the following description, and accompanying drawings where:

FIG. 10 is a timing diagram illustrating execution of an atomic read-modify-write operation according to the present invention.

DETAILED DESCRIPTION

In light of the above background on techniques for executing read-modify-write operations over a present day pipelined, split-transaction computer system bus, several examples will now be discussed with reference to FIGS. 1 through 5. These examples illustrate the problematic nature of present day computer system buses. More specifically, it will be shown that present day techniques for performing read-modify-write operations are deficient in the sense that pipelining and split-transaction features of a present day system bus must be suspended in order to perform a read-modify-write. Following this discussion, a detailed description of the present invention will be provided with reference to FIGS. 6 through 10. The present invention is an apparatus that supports effective execution of an atomic read-modify-write operation within a pipelined, split-transaction environment.

Figure 1:
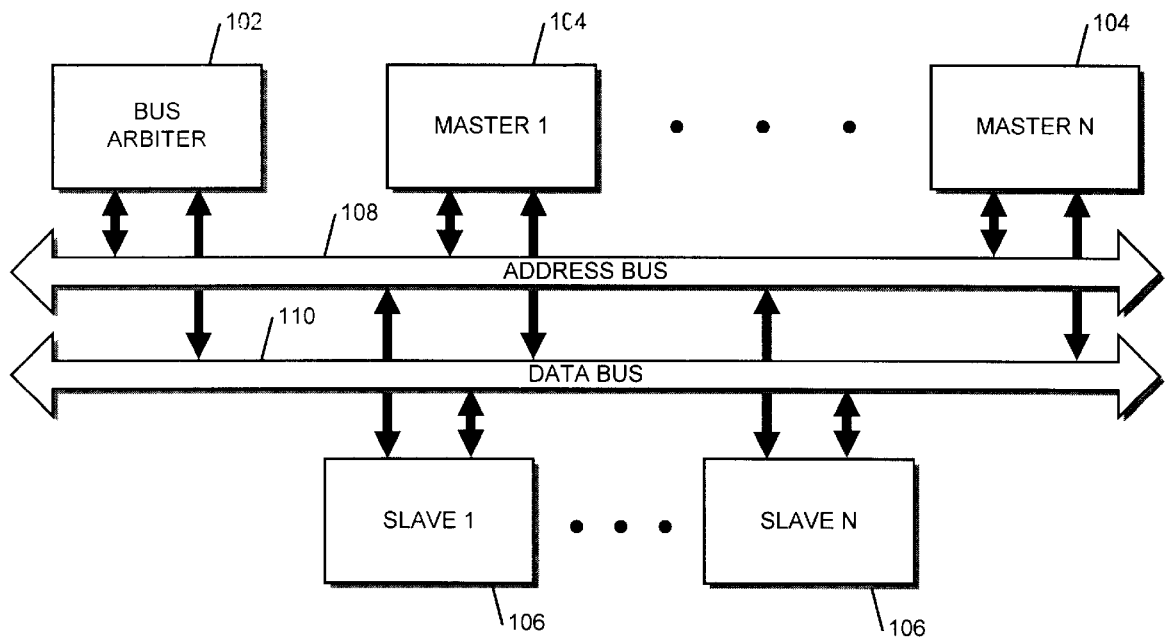
FIG. 1 is a block diagram illustrating a computer system configuration featuring interconnected bus master devices, bus slave devices, and a bus arbiter.

Referring to FIG. 1, a block diagram of a computer system bus configuration 100 is presented featuring N interconnected bus master devices 104, N bus slave devices 106, and a bus arbiter 102. The devices 104, 106 and bus arbiter 104 are interconnected via an address bus 108 and a data bus 110. The address bus 108 and data bus 110 in combination are referred to as a system bus 108/110. One skilled in the art will appreciate that while not shown, control lines are also present on the system bus.

In a typical computer system configuration 100, each of the master devices 104 and slave devices 106 are embodied as a specific component within the configuration 100. Usually, at least one of the master devices 104 is a central processing unit (CPU). The remaining master devices 104 may be embodied as additional CPUs, graphics processors, digital signal processors (DSPs), memory controllers, or other application-specific processors. A system configuration 100 that supports operation of more than one master device 104 is referred to as a multiple-master system 100. The slave devices 106 in a typical configuration 100 may be embodied as read-only memory (ROM), random access memory (RAM), peripheral bus interface logic, or any of a vast number of other application-specific slave devices.

FIG. 1 depicts devices 102, 104, 106 within a computer system configuration 100 as viewed from an information transfer perspective. From this point of view, each individual device 104, 106, 110 in a system 100 will fall into one of three categories: 1) a master device 104—i.e., a device capable of initiating a transaction over the system bus 108/110; 2) a slave device 106—i.e., a device capable of only responding to an initiated transaction over the system bus 108/110; or 3) an arbitration device 102—i.e., a device that controls access to the system bus 108/110 and overall bus traffic flow. Although the address bus 108 and data bus 110 are depicted in FIG. 1 as separate physical entities, one skilled in the art will appreciate that both buses 108, 110 can alternatively be embodied as a time-multiplexed address/data bus. In a time-multiplexed address/data bus configuration, a single physical medium is shared between the address bus 108 and the data bus 110 and control signals (not shown) are employed to indicate whether information over the single physical medium pertains to the address bus 108 or to the data bus 110.

In operation, the system bus 108/110 is the principal medium for transferring data between devices 104, 106. Data is transferred between devices 104, 106 over the data bus 110 and an identifier for the location of the data-an address-is provided by master devices 104 over the address bus 108. For instance, a CPU will routinely initiate data transfers over the system bus 108/110 to access memory, peripheral devices, or another master device 104. If the CPU desires to read data from, say, a location in memory, then the CPU will issue a read request over the address bus 108 to the bus arbiter 102 identifying the address of the location in memory. If the request to read the address in memory is granted by the bus arbiter 102, then the contents of the addressed location are subsequently transferred to the CPU over the data bus 110. In addition to requests by the CPU, other master devices 104 within the same system configuration 100 may also initiate transactions with slave devices 106 over the bus 108/110. Since it is thus possible for more than one master device 104 to initiate a transaction over the bus 108/110 at the same time, most bus architectures provide some mechanism to prevent bus contention. Thus the bus arbiter 102 shown in FIG. 1 is employed: its functions are to preclude bus contentions and to provide fair and timely access to the bus 108/110 for all initiating 104 and responding devices 106. The arbitration logic 102 manages transaction requests from initiating devices 104 according to prescribed arbitration algorithm. In some system configurations, the arbitration algorithm assigns a priority to each device 104, 106 and the bus arbiter 102 grants access to the bus 108/110 to the requesting device 104 having the highest priority. In other configurations, the arbitration algorithm assigns each device 104, 106 an identifier rather than a priority and the bus arbiter 102 grants access requests by employing an equal-priority scheme such as round robin. By treating each requester 104 with equal priority, the round robin scheme attempts to provide fair access to the bus 112 for all initiating devices 104. An in-depth discussion of bus arbitration schemes is beyond the scope of this application. Herein it is sufficient to note that 1) a present day computer system bus 108/110 may include a number of master devices 104 that are each capable of initiating transactions; and 2) bus arbitration logic 102 is provided to regulate access to and traffic flow over the bus 108/110. Generally speaking, an initiating device 104 issues a request for a transaction over a particular bus 108, 110 to the bus arbitration logic 102. According to its arbitration algorithm, the bus arbiter 102 either refuses the request or grants the request. If the request is granted, then the initiating device 104 completes the transaction according to the bus protocol.

At an architectural level, it is important to note that system designers prescribe specifications for the system bus 108/110 to support rapid and efficient data transfer between some number of master devices 104, N, and slave devices 106, N. Representative specifications include transfer rate, typically prescribed in megabits per second; bus width, typically prescribed in number of bits transferred per clock cycle; address/data bus 108/110 configuration, typically having either separate address 108 and data 110 buses or a multiplexed address/data bus 108/110; and a number of other detailed attributes to include arbitration scheme and request/grant protocol.

Early computer systems had 8-bit bus widths, only one bus master 104 (the CPU), and transfer rates on the order of kilobits per second. In contrast, a present day computer system 100 can have several bus masters 104, buses 108, 110 having multi-byte widths, and transfer rates on the order of gigabits per second. This progression in both capacity and complexity has been driven by several factors, perhaps the most significant being the proliferation of computer systems into nearly every area of society. Because of this, application demands have resulted in requirements for faster devices 104, 106, special-purpose devices such as DSPS, and devices that rapidly process large amounts of data such as graphics processors. computer systems are found in airplanes, cars, appliances, network servers, industrial controls, automated teller machines, video games and entertainment systems, cellular telephones, garage door openers, and most prevalently, desktop computers. Generally speaking, the most stringent application requirements tend to drive the specifications for a system bus 108/110.

In addition to the market pull for computer system improvements, enhancements in integrated circuit design and fabrication techniques have enabled computer system designers achieve revolutionary advancements in the art. Capabilities now exist for a complete computer system configuration 100 to be fabricated on a single integrated circuit. Whereas in prior years the address bus 108 and the data bus 110 were embodied as metallic traces on a printed circuit board, today they 108, 110 are designed and fabricated on the same chip substrate as the master devices 104, slave devices 106, and the bus arbiter 102. In addition, capabilities now exist to produce highly integrated stand-alone devices 104, 106 that can process tremendous amounts of data during a single clock cycle. The fact is that improvements in device functional capabilities—whether the devices are embodied as logic elements within a single integrated circuit or as separate integrated circuits within an interconnected system configuration 100—have forced computer system designers make improvements to the medium that interconnects those devices 104, 106, namely, the address/data bus 108/110. Two such improvements, pipelining and transaction splitting, are more specifically discussed with reference to FIG. 2.

Figure 2:
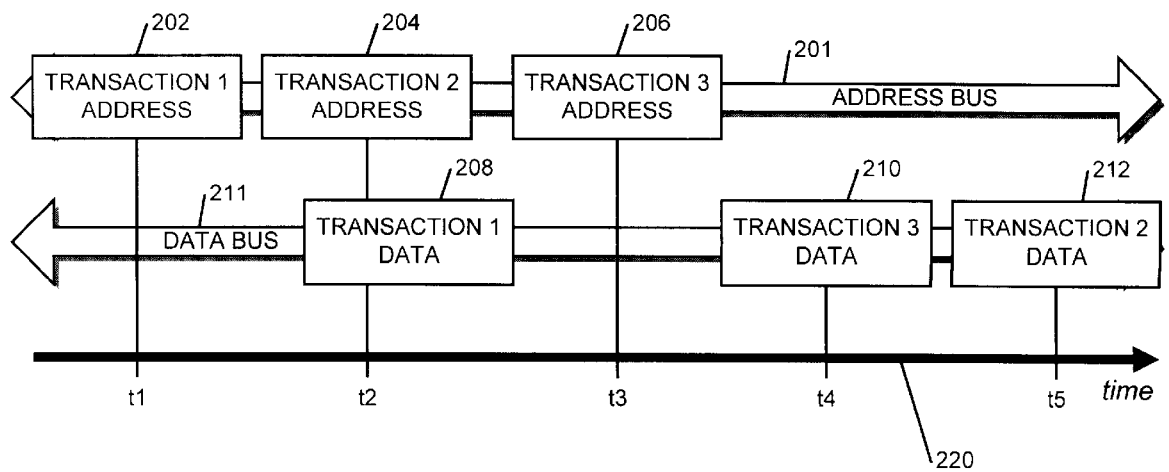
FIG. 2 is a timing diagram illustrating transactions between devices interconnected over a computer system bus like that shown in FIG. 1.

FIG. 2 is a timing diagram 200 illustrating transactions between devices that are interconnected over a computer system bus like that shown in FIG. 1. The timing diagram depicts three address transactions 202, 204, 206 that occur sequentially over an address bus 201 and three corresponding data transactions 208, 210, 212, that occur over a data bus 211. The occurrences of each of the transactions 202, 204, 206, 208, 210, 212 are presented with respect to relative time hacks along a time axis 220.

As alluded to above, a data transfer between a master device and a slave device comprises two distinct transactions: an address transaction 202, 204, 206 that transfers the address of the location to be accessed along with the type of access to be executed (e.g., a read from the location or a write to the location), and a subsequent data transaction 208, 210, 212 that transfers the data itself to/from the location identified by the supplied address. As system designers have become more focused on increasing the speed at which data transfers take place, one of the key improvements that has been developed is pipelining. In earlier bus architectures it was observed that no activity was occurring over the data bus 211 during an address transaction, and that the address bus 201 was idle during transactions over the data bus 211. This is because earlier bus arbiters granted requests for access at the system bus 201/211 level: a grant was issued to the requesting device for both an address transaction and a corresponding data transaction. That is, the grant allowed the requesting device exclusive access to both buses 201, 211 until its data transfer was completed. But by developing more intelligent bus arbitration devices, system configurations were later developed that allowed sequential data transfer operations to be pipelined over the buses 201, 211. As illustrated in the timing diagram 200, a bus architecture that supports transaction pipelining allows transactions to occur over both buses 201, 211 at the same time: an address transaction 204 corresponding to a following data transfer operation can be executed over the address bus 201 while a data transaction corresponding to a previous data transfer operation is executing over the data bus 211. The pipelining attribute of a present day bus architecture is depicted in the timing diagram 200 at time hack t2 where an address transaction 204 corresponding to transaction 2 executes over the address bus 201 while at the same time a data transaction 208 corresponding to transaction 1 executes over the data bus 211. Pipelining significantly improves the efficiency of data transfers over a system bus 201/211.

A second improvement for improving bus efficiency transaction splitting. In a bus architecture that allows split transactions, the activity of a master device in generating an address transaction 202, 204, 208 over the address bus 201 becomes even more decoupled from corresponding data transactions 208, 210, 212 over the data bus 211. Note that transaction 3 data 210 occurs over the data bus 211 prior to transaction 2 data 212 even though transaction 3 address 206 occurs after transaction 2 address 204 over the address bus 201. More intelligent master devices, slave devices, and arbitration logic are required to support split transactions, but providing such capability greatly improves the performance of a system. For example, devices that are capable of a fast response over the data bus 211 can proceed ahead of slower devices whereas in previous systems, the data bus 211 would remain idle while waiting for a specific transaction to complete.

Pipelining and transaction splitting allow present day computer system buses to operate faster and more efficiently, yet only when executing a series of independent read and write operations. When execution of a dependent series of read or write operations is required, such as execution of a read-modify-write operation, one or both of these two features must be sacrificed. Execution of a read-modify write operation, perhaps the most prevalent dependent operation that is executed over today's system buses, is more specifically discussed with reference to FIGS. 3 through 5.

Figure 3:
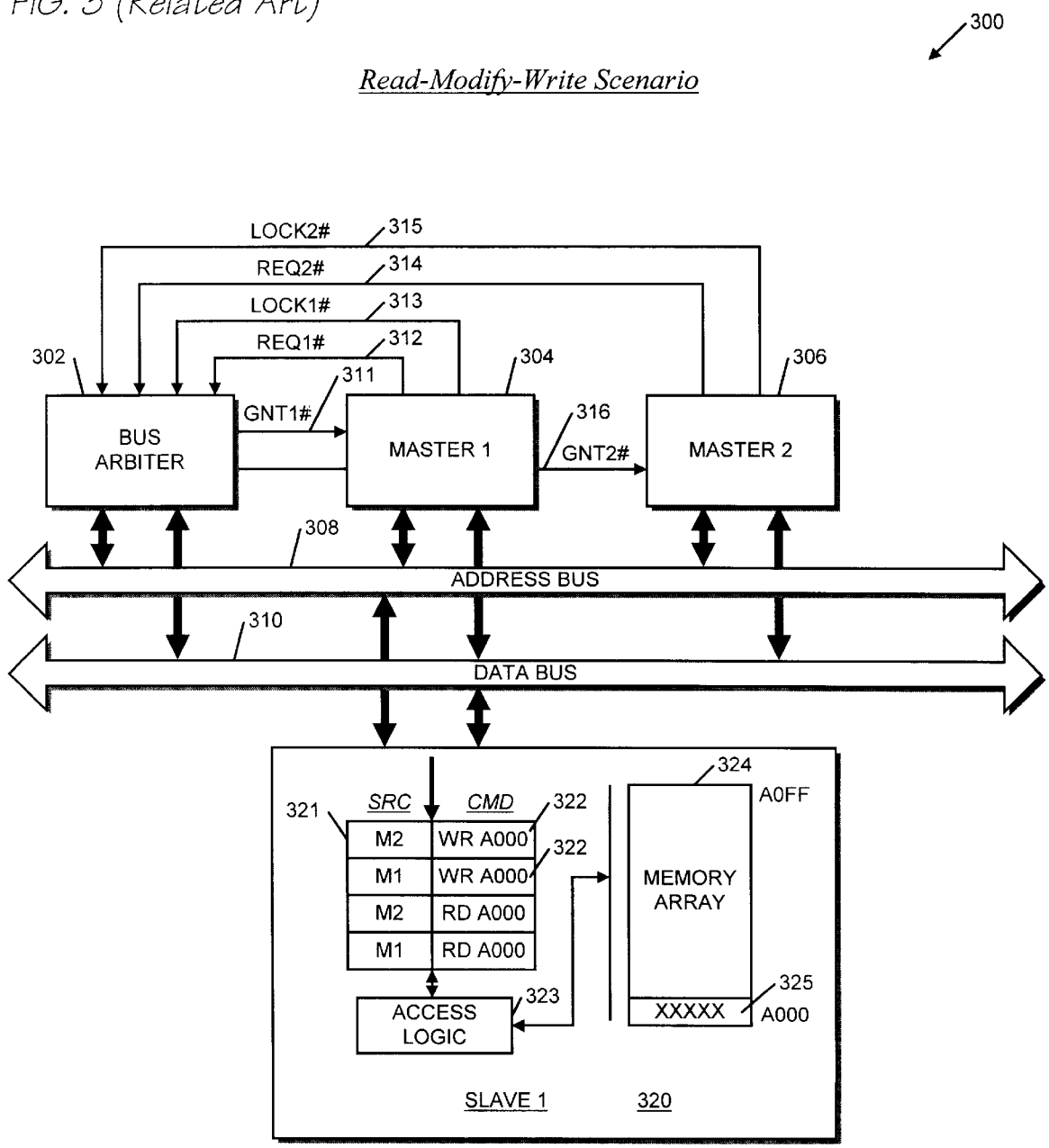
FIG. 3 is a block diagram illustrating execution of a read-modify-write operation.

Now referring to FIG. 3, a block diagram 300 is presented featuring elements for executing a read-modify-write operation within a present day computer system configuration. The block diagram 300 shows two master devices 304, 306, a slave device 320, and a bus arbiter 302 interconnected over an address/data bus 308/310 that supports both pipelining and split transactions. Three arbitration signals REQ1# 312, LOCK#1 313, and GNT1# 311 connect MASTER 1 304 to the bus arbiter 302. Likewise, three arbitration signals, REQ2# 314, LOCK2# 315, and GNT2# 316 connect MASTER 2 306 to the bus arbiter 302. The slave device 320 has an address/data buffer 321 consisting of a number of address/data entries 322. The address/data buffer is connected to access logic 323. The access logic 323 indexes into a memory array 324 that consists of a number of memory locations 325. It is to be appreciated that although the slave device is depicted with a single address/data buffer, the actual implementation could use multiple buffers, one for addresses, one for data, or two for address, reads versus writes, etc.

Operationally, when one of the master devices 304, 306 initiates an independent read or write operation to a location 325 in the slave memory array 324, it 304, 306 asserts its corresponding request signal 312, 314 to the arbiter 302. According to the arbitration algorithm employed, the arbiter 302 will grant the address bus 308 to the requesting master device 304, 306 via the grant signal 311, 316. The requesting device 304, 306 will then issue a command over the address bus 308 typically designating the slave device 320 itself, the address of the location 325 to be accessed, and whether the access is a read or a write. Depending upon the specific bus protocol employed, the responder will then either be required to request access to the data bus 310 or the data bus 310 will be automatically granted to the responder. The responder will then transfer the data to or from the location 325 over the data bus 310. If the operation is a read, then the responder is the slave device 320. If the operation is a write, then the responder that accesses the data bus is the master device 304, 306. The master device 304, 306, in the case of a write operation, is a responder because it completes the initiated transaction by transferring data over the data bus 310 to the slave device 320.

The address of the location 325 is provided in the address/data buffer 321 so that the access logic 323 can index into the memory array 324. In the case of a write operation, the access logic 323 receives the data from the buffer 321 and writes it to the location 325. In the case of a read operation,. the access logic 323 reads the data from the location 325 in memory 324 and provides it to the address/data buffer 321 so that the data can be transferred to the requesting master device 304, 306 over the data bus 310.

The scenario depicted in FIG. 3 shows four commands that have been sequentially provided over the address bus 308 into the address/data buffer 321: a read request to location A000 325 from MASTER 1 304, followed by a read request to location A000 325 from MASTER 2 306, followed by a write request to location A000 325 from MASTER 1 304, followed by a write request to location A000 325 from MASTER 2 306. Suppose that the contents of location A000 325 represent the availability of some resource within the computer system. A master device 304, 306 can thus check the availability of the resource by reading the location 325 and can indicate that it 304, 306 is exclusively employing the resource by writing data to the location 325. In the scenario depicted in the block diagram 300, if the resource is initially available, then based upon the sequence of reads and writes shown in the address/data buffer 321, both MASTER 1 304 and MASTER 2 306 will note that it is available, and both 304, 306 will subsequently indicate their exclusive employment of the resource. More specifically, because MASTER 2 306 is allowed to read the location 325 after MASTER 1 304 has read the location 325 and prior to the time it 304 writes to the location 325, MASTER 2 306 thinks that it can employ the resource when in fact, MASTER 1 304 notes by the following write that it 304 is exclusively employing the resource.

One skilled in the art will appreciate that the scenario described above is a problem if it is allowed to occur in a present day computer system. Deadlock can occur if independent read and write operations are employed to utilize resources. And resources whose availability is indicated via the contents of some addressable location 325 are ubiquitous within computer systems. So to preclude resource deadlock, virtually all system architectures provide means for master devices to perform a series of dependent transfers, also known as atomic data transfer operations. The case shown in the block diagram 300 indicates that the write operations to A000 are indeed dependent upon the foregoing read operations. As executed by both master devices 304, 306, the location 325 is first read, then the contents of the location are modified, and finally the modified data is written back to the location 325. Thus, this type of operation is known as a read-modify-write operation. And to perform an atomic read-modify-write operation, a master device 304, 306 must be provided with a mechanism to execute this sequence of dependent operations to/from a location 325 that preserves the contents of the location 325 until the sequence of dependent operations is completed. LOCK1# 313 and LOCK2# 315 signals are the means by which MASTER 1 304 and MASTER 2 306 indicate to the arbiter 302 that they are requesting an atomic read-modify-write operation. The lock signals 313, 315 are asserted typically in conjunction with their corresponding request signals 313, 314.

Present day bus architectures provide two different techniques for granting and executing atomic read-modify-write operations: bus locking and address reservation. The bus locking technique is discussed with reference to FIG. 4 and the address reservation technique is discussed with reference to FIG. 5.

Figure 4:
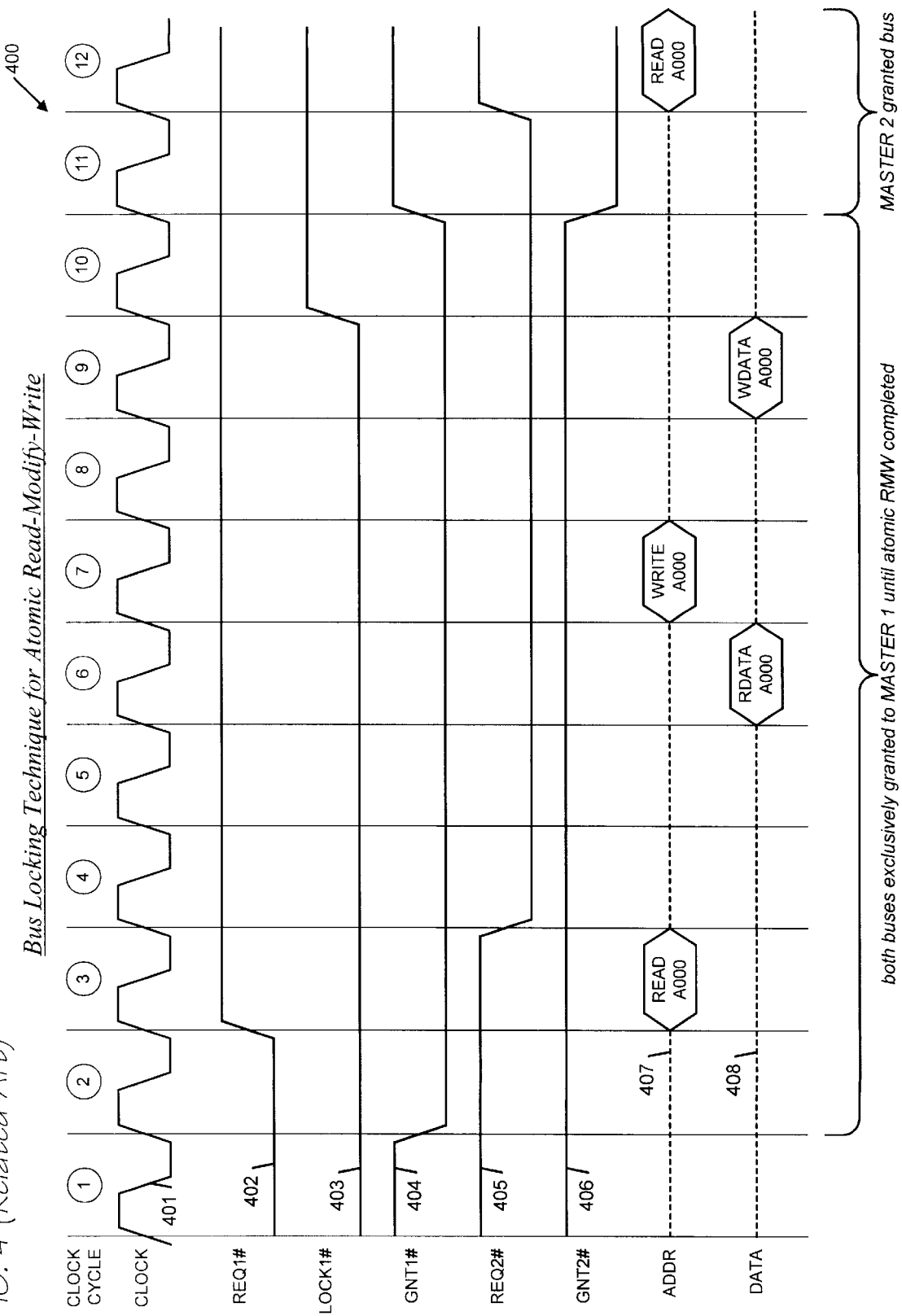
FIG. 4 is a timing diagram illustrating a present day bus locking technique for executing an atomic read-modify-write operation over a pipelined, split-transaction system bus.

Now referring to FIG. 4, a timing diagram 400 is presented illustrating a bus locking technique for executing an atomic read-modify-write operation over a pipelined, split-transaction system bus. The timing diagram 400 uses active low signals. It is appreciated that active high signaling may be used without loss of generality. The timing diagram depicts signals corresponding to a first master device like that shown in FIG. 3: a transaction request signal 402, REQ1#; an atomic read-modify-write request signal, 403, LOCK1#, and a transaction grant signal 404, GNT1#, provided by a bus arbiter. The timing diagram 400 also depicts signals corresponding to a second master device like that shown in FIG. 3: a transaction request signal 405, REQ2#; and a transaction grant signal 406, GNT2#, provided by a bus arbiter. The timing diagram 400 additionally depicts activity over an address bus 407 and a data bus 408 like those discussed with reference to FIG. 3. In this example, the first master device conducts the read-modify-write operation using the bus locking technique. States of each of the signals 402–408 are shown with respect to cycles of a clock signal 401.

At a high level, the bus locking technique supports the execution of an atomic operation by suspending the split-transaction capabilities of a present day bus until the operation is completed. Following completion of the atomic operation, then split-transaction features are restored.

During cycle 1, note that the first master device has asserted both REQ1# 402 and LOCK1# 403, thus requesting an atomic read-modify write operation.

During cycle 2, the bus arbiter grants the atomic operation by asserting GNT1# 404.

During cycle 3, the first master device issues a read command to address A000 over the address bus 407, de-asserts REQ1# 402, and continues to assert LOCK1# 403. By continuing to assert LOCK1# 403, the first master indicates that the atomic operation is still in progress. There are several different means for assigning and interpreting the states of signals to indicate the ongoing conduct of an atomic read-modify-write operation, but one skilled in the art will acknowledge that the means presented in the timing diagram 400 is representative of systems that utilize bus locking.

During cycle 4, the second master device asserts REQ2# requesting execution of a transaction, but because execution of the atomic read-modify-write operation by the first master device is still in progress, the second master device will not be granted access to the address bus 407 until cycle 11.

During cycles 5 through 10, execution of the atomic read-modify-write operation by the first master device is continued, culminating with de-assertion of its grant signal 404, GNT1#, at the end of cycle 10. Data is provided from a slave device over the data bus 408 during cycle 6 corresponding to the read command issued over the address bus 407 during cycle 3. Following this, a write command is issued over the address bus 407 during cycle 7 and its corresponding data is transferred over the data bus 408 during cycle 9.

During cycle 11, access to the address bus 407 is granted to the second master device as indicated by assertion of its grant signal 406, GNT2#.

What is significant to note from the timing diagram 400 is that utilization of the bus locking technique to support atomic read-modify-write operations is actually a temporary suspension of both pipelining and split transaction features. Pipelining is suspended because the bus arbiter cannot know, a priori, when the atomic operation will be completed. The bus arbiter must rely on the state of LOCK1# 403 to indicate when the operation is completed and cannot pipeline another address transaction over the address bus 407 while the data transaction corresponding to the write is executing over the data bus 408. The split-transaction feature of the bus is also suspended during the atomic transaction because the first master device is allowed exclusive access to both address 407 and data 408 buses until the atomic read-modify-write operation is completed. The bus locking technique is used in several architectures today, including the Pentium® bus from Intel Corporation and the AMBA™ bus from ARM, Ltd. And each time an atomic operation is executed, pipelining and transaction-splitting features are sacrificed, thus decreasing bus efficiency.

Figure 5:
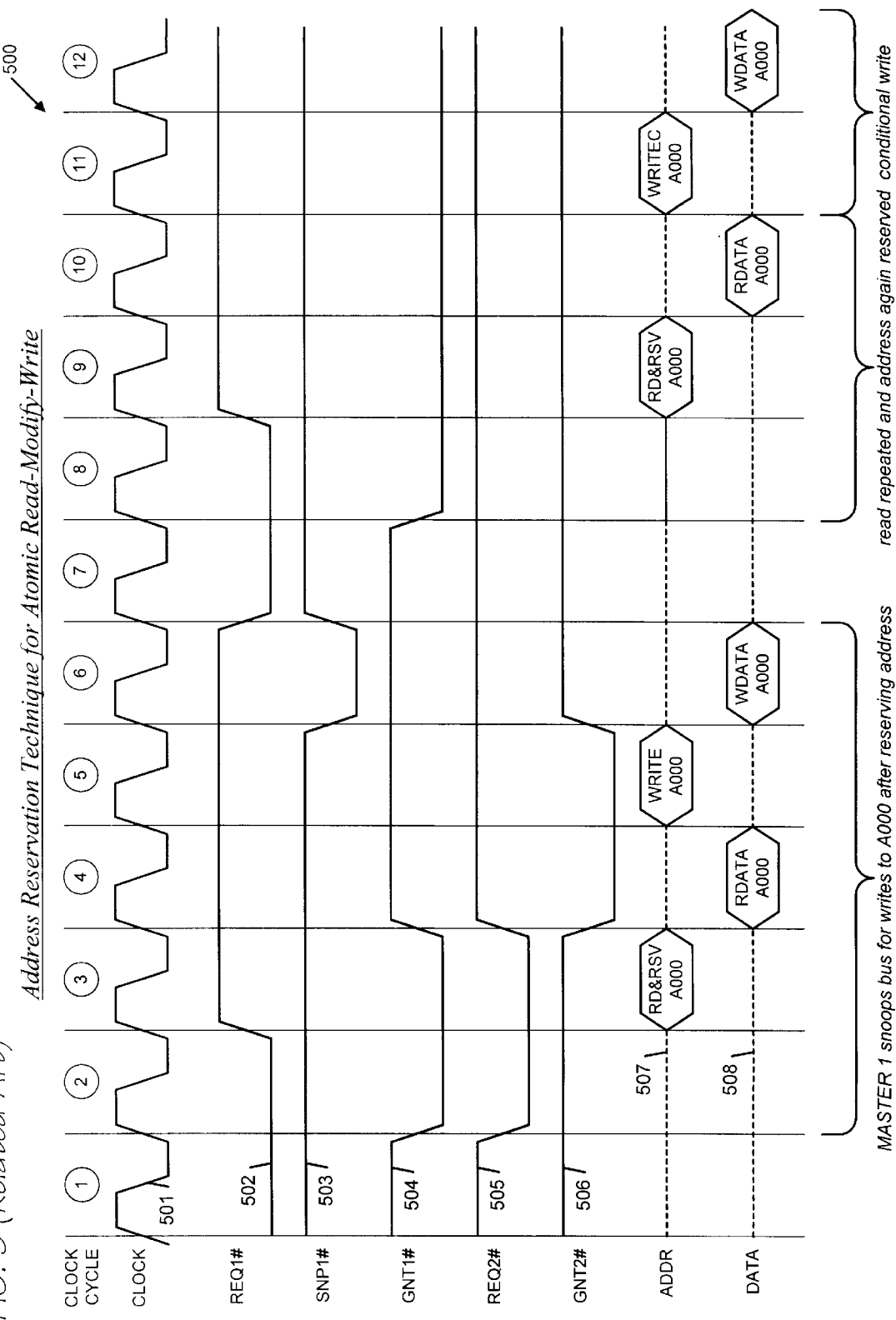
FIG. 5 is a timing diagram illustrating a present day address reservation technique for executing an atomic read-modify-write operation over a pipelined, split-transaction system bus.

Now referring to FIG. 5, a timing diagram 500 is presented illustrating a present day address reservation technique for executing an atomic read-modify-write operation over a pipelined, split-transaction system bus. The timing diagram 500 depicts signals corresponding to a first master device, a second master device, a bus arbiter, and data and address buses, similar to those signals discussed with reference to FIG. 4. Like signals have like references, the hundreds digit being replaced by a 5. In contrast, however, to the signal set shown for the bus locking technique, the signal set for address reservation does not provide a lock signal. Rather, a snoop signal 503, SNP1#, is provided. The snoop signal 503 may be external to a master device or internal. The purpose of the snoop signal 503 is to indicate to the requesting master device that a write operation has been executed to a reserved address. In this example, a first master device conducts the read-modify-write operation using the address reservation technique. States of each of the signals 502–508 are shown with respect to cycles of a clock signal 501.

At a high level, the address reservation technique supports the execution of an atomic operation by allowing a master device to "reserve" an address for a pending write operation, the pending write operation being necessary to complete the atomic read-modify-write operation. Following reservation of the address, logic either external to or internal to the master device monitors activity over the system bus 507/508 to detect a write to the reserved address. If a write is detected, then the snoop signal 503 is asserted to indicated that the contents of the reserved address are not consistent with what was previously read by the master device. The master device is thus forced to repeat the read of the address or abandon the read-modify-write operation altogether.

During cycle 1, note that the first master device has asserted REQ1# 502, thus requesting an access to the address bus 507 to perform a read-modify write operation.

During cycle 2, the bus arbiter grants access to the bus 507 by asserting GNT1# 504.

During cycle 3, the first master device issues a read-and-reserve command to address A000 over the address bus 507 and de-asserts REQ1# 502. The read-and-reserve command directs snoop logic to begin monitoring activity to address A000. Also during cycle 3, note that a second master device is currently requesting bus access by having asserted REQ2# during cycle 2.

During cycle 4, the data corresponding to the read-and-reserve command from address A000 is provided over the data bus 508 to the first master device. Request and grant signals corresponding to arbitration of the data bus 508 are not shown in the timing diagram 500 for clarity. One skilled in the art will appreciate that the technique used to obtain access to the data bus is irrelevant to this discussion. Also during cycle 5, the bus arbiter grants the second master device access to the address bus 507 by asserting GNT2# 506.

During cycle 5, the second master device issued a write command to address A000 over the address bus 507. The write command is detected by the snoop logic.

During cycle 6, the snoop logic asserts SNP1#, thus indicating to the first master device that a write is being executed to the reserved address, A000. Also during cycle 6, the data corresponding to the write command is provided by the second master device over the data bus 508. At this point, the first master device must choose to either repeat the read-modify-write operation or abandon it altogether.

During cycles 7 through 12, the first master device repeats the read-modify-write operation by first asserting REQ1# 502 during cycle 7 and by finally performing a conditional write of data to the address during cycle 12.

Several present day architectures utilize address reservation to accomplish read-modify-write operations. Perhaps the most well-known processor is the Motorola PowerPC®. These processors provide a conditional write instruction that will perform a write to a reserved address only if it has not been modified. Otherwise, the instruction will not write the address and will jump to a specified location, thus allowing a programmer the flexibility to repeat the read-modify-write.

While preserving split transactions and pipelining, the address reservation technique provides no mechanism whereby accomplishment of a read-modify-write is certain. In a system configuration that comprises shared resources that are in constant demand, a given device may very well be unable to acquire a resource. Each time the given device reserves an address, some other master device may have a write pending that will prevent acquisition by the given device.

The examples discussed with reference to FIGS. 1 through 5 clearly illustrate how present day bus architectures are wanting when it comes to execution of read-modify-write operations, or for any series of dependent transactions. These buses are designed to efficiently expedite the execution of independent reads and writes, but their efficiency is drastically reduced when dependent sequences of transactions are executed.

The present invention overcomes the limitations of present day system bus architectures by providing apparatus that allows atomic read-modify-write operations to be performed with certainty while preserving pipelining and split-transaction capabilities of a system bus. The present invention will now be more specifically discussed with reference to FIGS. 6 through 10.

Figure 6:
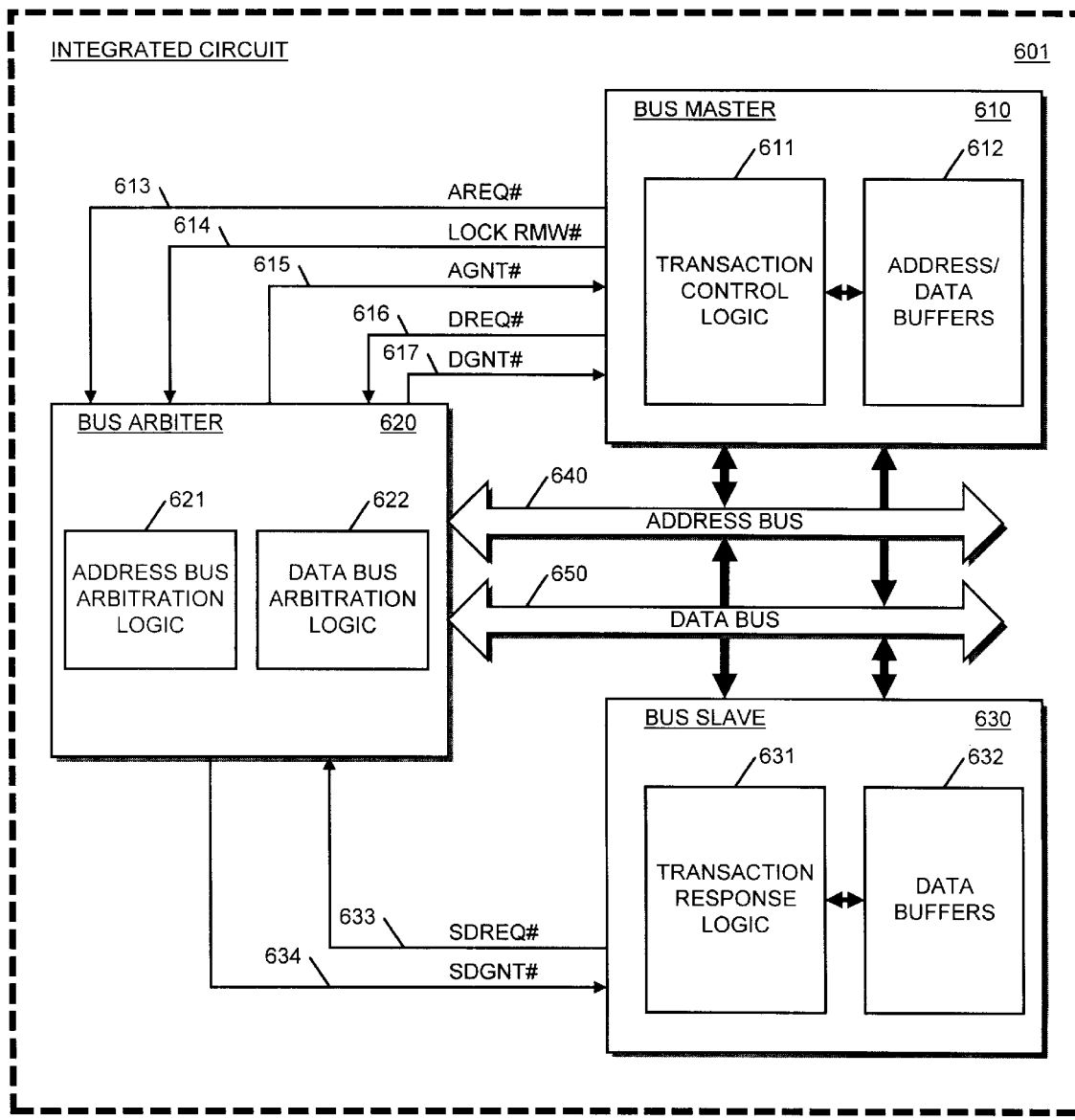
FIG. 6 is a block diagram illustrating an apparatus for executing an atomic read-modify-write operation according to the present invention.

Referring to FIG. 6, a block diagram 600 is presented illustrating an apparatus for executing an atomic read-modify-write operation according to the present invention. The apparatus comprises a bus master device 610, a bus slave device 630, and a bus arbiter 620, all of which are interconnected by an address bus 640 and data bus 650 within a single integrated circuit 601. In one embodiment the address bus 640 is 32-bits in width and the data bus 650 is 32-bits in width. In an alternative embodiment, the data bus is 64-bits in width. In another embodiment, the data bus is 128-bits in width. The bus master device 610 has address/data buffers 612 for queuing up transactions to be conducted over the address/data bus 640/650 and transaction control logic 611 for executing the transactions. The bus master 610 provides an address bus request signal 613, AREQ#, an atomic operation request signal 614, LOCK RMW#, and a data bus request signal 616, DREQ#, to the bus arbiter 620. The bus arbiter 620 provides an address bus grant signal 615, AGNT#, and a data bus grant signal 617, DGNT#, to the bus master 610. In a multi-master configuration, separate signals corresponding to signals 613–617 are provided between each, master device 610 and the bus arbiter 620. In one embodiment, the present invention supports up to eight master devices 610.

The bus slave device 630 has data buffers 632 for receiving commands and data over address/data bus 640/650. The bus slave 630 also has transaction response logic 631 for processing commands and data in the data buffers 632. The bus slave device 630 in addition provides a slave data bus request signal 633, SDREQ#, to the bus arbiter 620 and the bus arbiter 620 outputs a data bus grant signal 634, SDGNT#, to the slave device 630. Separate signals corresponding to signals 633–634 interconnect each additional slave 630 device in a system configuration to the bus arbiter 620.

In operation, the bus arbiter 620 according to the present invention grants access to devices 610 requesting address bus transactions independently from granting access to devices 610, 630 requesting data bus transactions. Address bus arbitration logic 621 manages access to and traffic flow over the address bus 640 and data bus arbitration logic 622 manages access to and traffic flow over the data bus 650. The system bus 640/650 according to the present invention provides both pipelining and split-transaction capabilities as discussed above. In one embodiment, commands over the address bus 640 contain a transaction identification field (not shown) whose contents uniquely identify the requested operation. When a slave device 630 responds over the data bus 650, the transaction identification field contents are provided along with the data so that a number of outstanding split-transactions can be correlated to a requesting device 610. What distinguishes the present invention from present day bus architectures is, however, the technique that is employed to perform atomic read-modify-write operations. In contrast to the bus locking technique and the address reservation technique, the present invention provides a mechanism that ensures certain and uninterrupted execution of the atomic operation while at the same time preserving both pipelining and split-transaction features of the system bus 640/650.

The bus master 610 indicates an intent to perform an independent read or write operation by asserting AREQ# 613. For these independent operations, address bus arbitration logic 621 within the bus arbiter 620 will assert AGNT# 615 for only one clock cycle, thus allowing the bus master 610 to issue a read or write command over the address bus 640. To request a read-modify-write operation, the bus master 610 asserts both AREQ# 613 and LOCK RMW# 614. According to the present invention, the bus arbiter 620 responds by granting address bus access to the requesting master 610 for two cycles instead of one cycle. During the first of the two cycles, the requesting master 610 will issue a read command to the indicated slave device 630 designating the address of a location to be read. This command is followed in the next cycle by a write barrier command that designates the same address and furthermore directs transaction response logic 631 within the slave device to prevent any accesses to the address until the data corresponding to the write barrier transaction is provided by the master device 610. Subsequent transactions in data buffers 632 to. other addresses are allowed to proceed, but any future transactions to the address designated by the write barrier command are precluded from executing by the transaction response logic 631 until the write barrier transaction completes. In essence, the hold on the designated address is transparent to operation of the bus 640/650. The slave device 630 according to the present invention experiences the delay, but only delay associated with the designated address; transactions to other addresses in the slave device 610 and moreover, transactions between other devices connected to the bus 640/650 can be executed with certainty and without delay.

Figure 7:
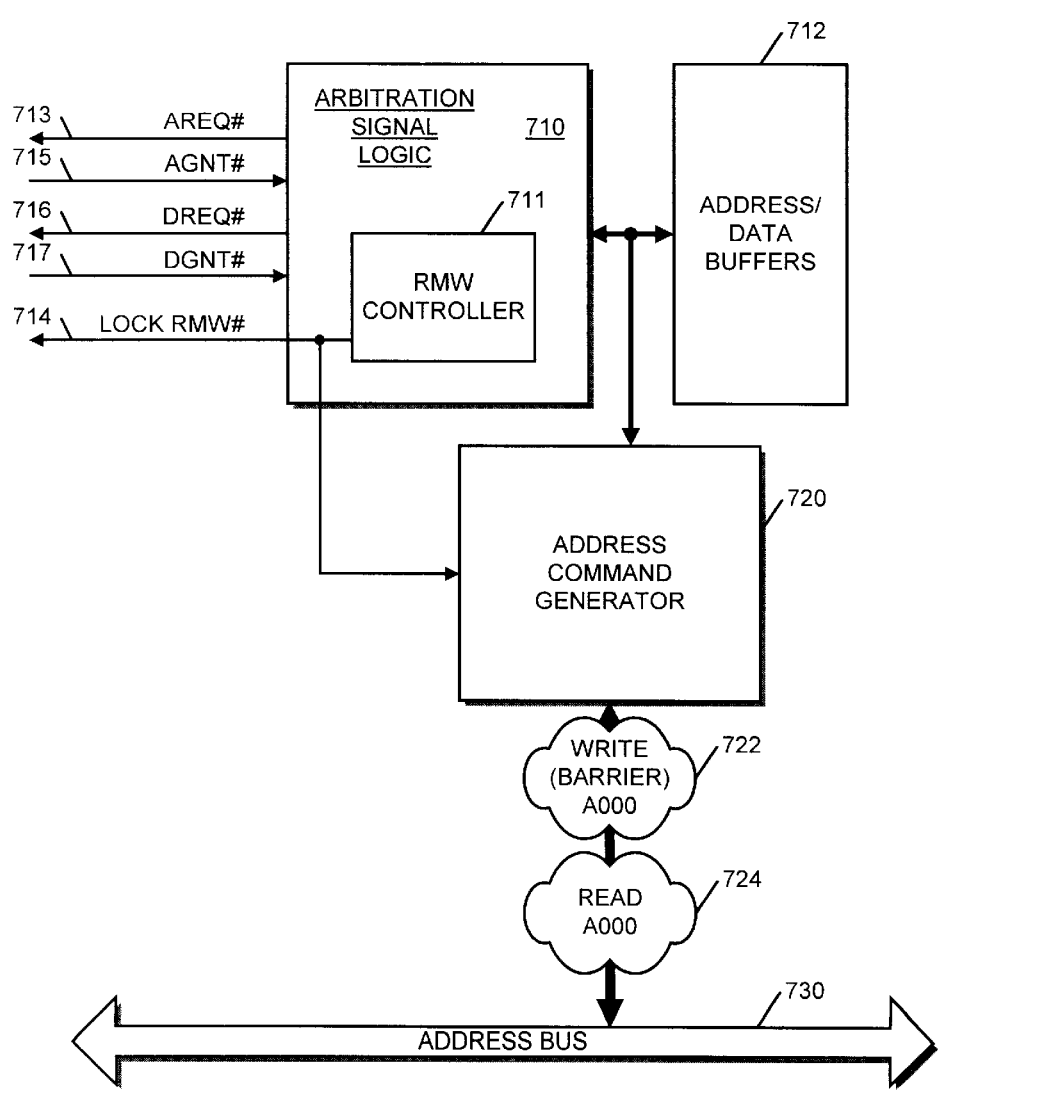
FIG. 7 is a block diagram of transaction control logic within a bus master according to the present invention.

Now referring to FIG. 7, a block diagram is presented detailing transaction control logic 700 within a bus master according to the present invention. The transaction control logic 700 has address/data buffers 712 that are connected to arbitration signal logic 710 and an address command generator 720. The arbitration signal logic 710 has a read-modify-write controller 711 that outputs a read-modify-write request signal 714, LOCK RMW#. The address command provides commands 722, 724 to an address bus 730.

In operation, the arbitration signal logic 710 requests the address bus 730 by asserting an address bus request signal 713, AREQ#. Access to a data bus (not shown) is requested by asserting a data bus request signal 716, DREQ#. An address bus grant signal 715, AGNT#, and a data bus grant signal 717, DGNT#, are provided by a bus arbiter (not shown) according to the present invention to grant access to the address bus 730 and data bus, respectively. But when the arbitration logic 710 processes a read-modify-write operation from the address/data buffers 712, in addition to asserting AREQ# 713, the read-modify-write controller 711 causes LOCK RMW# 714 to be asserted.

Indication of the read-modify-write operation is provided to the bus arbiter as well as to the address command generator 720. According to the present invention, the bus arbiter will assert AGNT# 715 for two cycles rather than one to allow a write barrier command 722 to immediately follow a read command 724 over the address bus 730. Thus a target slave device (not shown) is directed to protect an address indicated by the write barrier command 722 until the corresponding data is provided over the data bus to complete the read-modify-write operation.

Figure 8:
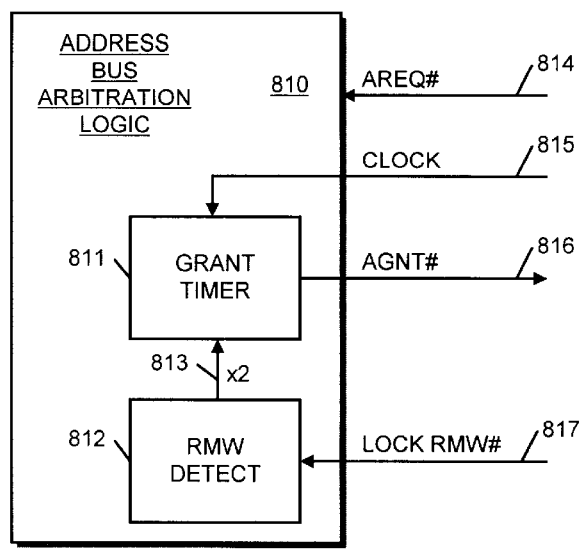
FIG. 8 is a block diagram of a bus arbiter according to the present invention.

Now referring to FIG. 8, a block diagram is presented featuring a bus arbiter 800 according to the present invention. The bus arbiter 800 has address bus arbitration logic 810 that contains a grant timer 811 and read-modify-write request detection logic 812.

For independent operations, the grant timer 811 issues an address bus grant signal 816, AGNT#, to a master device (not shown) that has asserted an address bus request signal 814, AREQ#, for only one cycle of a bus clock signal 815, CLOCK. But when a master device requests a read-modify-write operation by additionally asserting a read-modify-write request signal 817, LOCK RMW#, the read-modify-write signal detection logic 812 directs the grant timer 811 to extend the time for AGNT# 816 to two cycles of CLOCK 815 instead of one cycle. Thus the bus master is allowed to issue a read command and a write barrier command over an address bus back-to-back.

Figure 9:
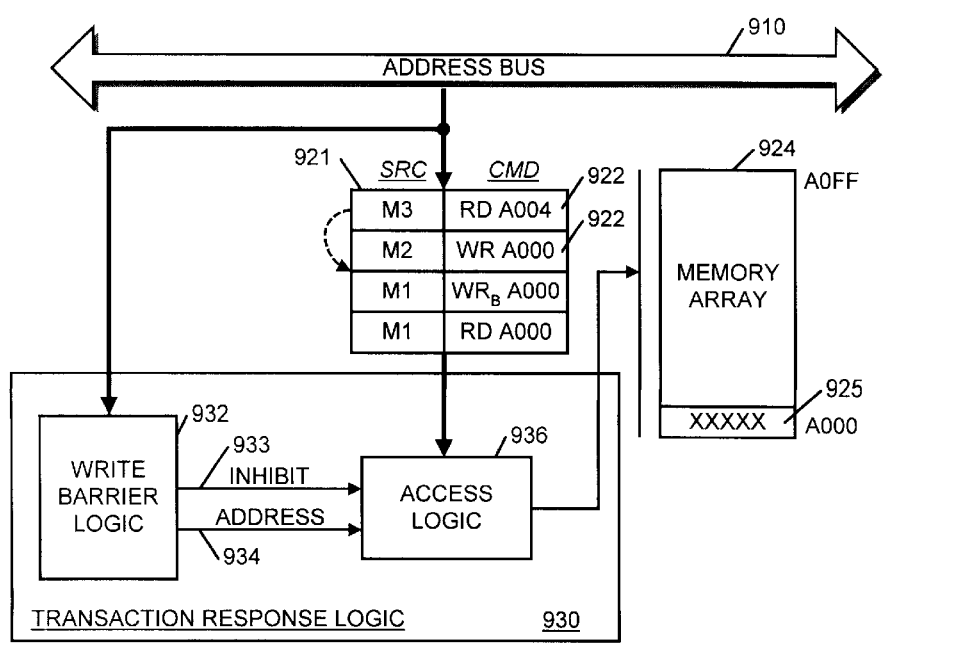
FIG. 9 is a block diagram featuring transaction response logic within a bus slave according to the present invention.

Now referring to FIG. 9, a block diagram is presented featuring transaction response logic 930 within a bus slave 900 according to the present invention. The bus slave device 900 has a command buffer 921 that receives commands from an address bus 910 and a data bus (not shown). The command buffer 921 consists of a number of buffer entries 922, each of the entries 922 containing fields that identify commands as received along with source of the commands. The transaction response logic 930 includes access logic 936 and write barrier logic 932. The write barrier logic 932 provides an inhibit signal 933, INHIBIT, and an address signal 934, ADDRESS, to the access logic 936. The access logic 936 indexes designated locations 925 in a memory array 924 to perform operations corresponding to read and write commands that are received for the command buffer 921.

When a write barrier command is received from the address bus 910 into the command buffer 921, the write barrier logic 932 asserts INHIBIT 933 and provides the address corresponding to the write barrier command to the access logic 936. Thus the access logic 936 is directed to preclude accesses to the corresponding address until data associated with the write barrier command is provided from the master device performing the read-modify-write operation.

FIG. 9 shows four commands as in the command buffer 921: a read command of address A000 925 from master M1, a write barrier command to A000 925 from master M1, a write command to A000 925 from master M2, and a read command of address A004 from master M3. The commands from master M1 are the address bus commands associated with an atomic read-modify-write operation.

Because A000 925 is protected from accesses until the data corresponding to the write barrier command is received, the transaction response logic 930 will not allow the write command to A000 925 from master M2 to execute. But in one embodiment the read command of A004 from master M3 is allowed to proceed ahead of the write command to A000 925 from master M2. In an alternative embodiment, execution of all commands subsequent to a write barrier command is precluded until the write barrier data is received over the data bus.

Now referring to FIG. 10, a timing diagram 1000 is presented illustrating execution of an atomic read-modify-write operation according to the present invention. The timing diagram 1000 depicts signals corresponding to a first master device according to the present invention: an address bus request signal 1002, AREQ1#; a read-modify-write request signal 1003, LOCK RMW#; and an address bus grant signal 1004, AGNT1#. In addition, the diagram 1000 includes signals corresponding to a second master device according to the present invention: AREQ2# 1005 and AGNT2# 1006. For clarity, data bus arbitration signals are not shown. In addition, the diagram 1000 depicts activity over an address bus 1007 and a data bus 1008 according to the present invention. The buses 1007, 1008 provide for both transaction pipelining and split transactions. Execution of the atomic read-modify-write operation is depicted with respect to cycles of a bus clock signal 1001, CLOCK.

During cycle 1, the first master device requests access to the address bus to perform a read-modify-write operation by asserting both AREQ1# 1002 and LOCK RMW# 1003.

During cycle 2, a bus arbiter (not shown) according to the present invention asserts AGNT1# 1004 for two cycles, rather than one cycle, thus allowing the first bus master to issue a read command followed by a write barrier command over the address bus 1007. The diagram 1000 depicts one embodiment of the present invention where corresponding actions over the address bus 1007 take place one cycle after a grant is issued to ensure registration. In another embodiment, the corresponding actions occur exactly two cycles following issue of a grant. Also during cycle 2, note that the second bus master asserts AREQ2# 1005, requesting access to the address bus 1007.

During cycle 3, the first master device issues a read command over the address bus 1007 designating address A000 in a target slave device.

During cycle 4, the address bus grant 1004 is removed for the first master device and is issued via AGNT2# 1006 to the second master device. Since the embodiment shown in the diagram 1000 depicts one-cycle registration, also during cycle 4, the first master device issues a write barrier command over the address bus 1007. As described above, the write barrier command directs the target slave device to bar any transactions to the designated address, A000, until the data corresponding to the write barrier command is provided by the first master device over the data bus 1008. In this example, the data is provided during cycle 10. However, in the interim cycles, both the address bus 1007 and data bus 1008 are available to support both pipelined and split transactions.

During cycle 5, the second master device issues a read command over the address bus 1007 to address A004 in the same target slave device. In addition, the data corresponding to the previously issued read command is transferred over the data bus 1008 to the first master device. These events in cycle 4 illustrate that the present invention preserves pipelining during read-modify-write transactions.

During cycle 7, the data corresponding to the read command issued during cycle 5 is provided to the second master device over the data bus 1008. This is an example of a split-transaction. Note that the read command to A004 follows the write barrier command to A000, yet the data corresponding to the read command to A004 is allowed to proceed over the data bus 1008 ahead of the data corresponding to the write to A000.

During cycle 10, the first master device provides the write barrier data to address A000 over the data bus, thus completing the read-modify-write operation. At this point, the target slave device will allow any other pending transactions to address A000 to proceed.

The examples discussed with reference to FIGS. 6 through 10 clearly demonstrate that the present invention brings significant performance improvement to bus-interconnected computer system configurations, particularly when operating in a multi-master environment that relies heavily on the use of dependent transactions to monitor and acquire shared resources. By providing an apparatus that preserves both pipelining and split-transaction capabilities, atomic transactions between devices are allowed to execute without penalizing the remaining devices on the bus.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer languages (RTL), Verilog HDL, VHDL, AHDL (Altera Hardware Description Language), or other programming and/or circuit (i.e., schematic) capture tools available in the art. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention using a combination of hardware and software are also possible. Therefore, the embodiments expressed above are within the scope of the invention and should also be considered protected by this patent. In addition, the present invention has been particularly characterized in terms of executing a read-modify-write sequence of transactions over a system bus. As alluded to above, such a named sequence is used herein to characterize a large number of specific sequences of dependent transactions known in the art today to include swap, exchange contents, compare and exchange contents, and test bit and modify contents. Application of the present invention comprehends any sequence of dependent operations wherein it is required to protect the contents of some location in a slave device for a future pending write.

Furthermore, the present invention has been described in terms of a bus master apparatus that is the primary bus interface for an element of a computer system configuration. This element can be embodied as a CPU, graphics processor, or DSP, as noted above, however, it should not be construed that these examples preclude the employment of the present invention in other, less commonly known components to include communications processors, reduced instruction set computers (RISC), video processors, memory controllers, and microcontrollers.

Moreover, present day integrated circuit technology allows the incorporation of a system bus along with a few associated master and slave devices to be fabricated on the same integrated circuit. Future advances in integrated circuit design and fabrication technologies may provide the capability to completely incorporate a system bus along with all of its connected devices within the same integrated circuit. The present invention comprehends such improvements. It is entirely within the scope of the present invention to provide support for the execution of atomic transactions within a pipelined, split-transaction bus environment, regardless of the embodiment of the bus, be it on-chip or off-chip.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for controlling a read-modify-write transaction to an address in a bus slave device, the apparatus comprising:

transaction control logic, configured to provide a write barrier command from a bus master device over an on-chip system bus to the bus slave device; and transaction response logic, coupled to said transaction control logic, configured to receive said write barrier command, and configured to preclude execution of any other transaction to the address within the bus slave device until completion of the read-modify-write transaction while allowing execution of other transactions to other addresses within the bus slave device.

2. The apparatus as recited in claim 1, wherein said bus master device is part of a central processing unit (CPU), said CPU being connected to said on-chip system bus, and wherein said CPU and said on-chip system bus are embodied on a single integrated circuit.

3. The apparatus as recited in claim 2, wherein said on-chip system bus comprises:

an address bus, for transmitting commands from said bus master device to the bus slave device, wherein a particular command directs the bus slave device to execute a particular operation upon a particular address; and a data bus, for transmitting data corresponding to said command.

4. The apparatus as recited in claim 3, wherein the width of said address bus comprises a 32 bits.

5. The apparatus as recited in claim 3, wherein the width of said data bus comprises 32 bits, 64 bits, or 128 bits.

6. The apparatus as recited in claim 3, wherein said on-chip system bus supports pipelined transactions and split transactions between a plurality of bus master devices and a plurality of bus slave devices.

7. The apparatus as recited in claim 6, wherein one of said plurality of bus master devices issues a first command over said address bus to one of said plurality of bus slave devices while another of said plurality of bus master devices is transmitting data to another of said plurality of bus slave devices.

8. The apparatus as recited in claim 7, wherein said split transactions provide that first data elements corresponding to a first transaction are interlaced in transmission over said data bus with second data elements corresponding to a second transaction.

9. The apparatus as recited in claim 8, wherein said transaction control logic provides said write barrier command over said address bus immediately following provision of a read command to the address bus.

10. The apparatus as recited in claim 9, wherein a bus arbiter on said address bus allows said transaction control logic to provide said write barrier command in response to a request from said bus master device to execute the read-modify-write transaction.

11. A computer system bus apparatus for executing a read-modify-write transaction to an address within a bus slave device, the computer system bus apparatus comprising:

a bus master device, for requesting. the read-modify-write write transaction, wherein said bus master device comprises:

command generation logic, for issuing, over an address bus, a read command to the address followed immediately by a write barrier command to the address; and write barrier logic, coupled to said bus master device, for receiving said read command and said write barrier command, for preventing reads/writes from/to the address until data corresponding to the read-modify-write transaction is written to the address while allowing reads/writes from/to other addresses within the bus slave device.

12. The computer system bus apparatus as recited in claim 11, wherein said address bus provides interconnection between said bus master device, the bus slave device, and other devices fabricated on the same integrated circuit.

13. The computer system bus apparatus as recited in claim 12, wherein a separate data bus transfers data elements corresponding to said read command and said write barrier command.

14. The computer system bus apparatus as recited in claim 13, wherein the width of said data bus comprises 32 bits, 64 bits, or 128 bits.

15. The computer system bus apparatus as recited in claim 13, wherein said address bus and said data bus allow execution of both pipelined transactions and split transactions.

16. The computer system bus apparatus as recited in claim 11, wherein said bus master device further comprises:

an arbitration signal generator, coupled to said command generation logic, for indicating to an address bus arbiter an intent to perform the read-modify-write operation.

17. A computer program product comprising:

a storage medium, having computer readable instructions embodied thereon, for causing a computer upon which said computer readable instructions are executed to describe an integrated circuit device, said computer readable instructions comprising:

first instructions, for causing said computer to describe transaction control logic, wherein said transaction control logic provides a write barrier command from a bus master device over an address bus to a bus slave device; and second instructions, for causing said computer to describe transaction response logic, wherein, upon receipt of said write barrier command, said transaction response logic precludes reads or writes to an address within said bus slave device until data, provided over a separate data bus, corresponding to said write barrier command is written into said address.

18. The computer program product as recited in claim 17, wherein said transaction response logic allows the execution of reads/writes to other addresses within said bus slave device.

19. The computer program product as recited in claim 17, wherein the width of said data bus comprises 32 bits, 64 bits, or 128 bits.

20. The computer program product as recited in claim 19, wherein said address bus and said data bus allow execution of both pipelined transactions and split transactions.

21. The computer program product as recited in claim 19, wherein said transaction control logic comprises:

an arbitration signal generator, for indicating to an address bus arbiter an intent to perform a read-modify-write operation.

22. The computer program product as recited in claim 21, wherein said transaction control logic further comprises:

command generation logic, for providing a read command to said address over said address bus, wherein said read command immediately precedes said write barrier command.

23. The computer program product as recited in claim 22, wherein said computer readable instructions further comprise:

third instructions, for causing said computer to describe bus arbitration logic within said address bus arbiter, wherein, upon detecting said intent to perform said read-modify-write operation, said bus arbitration logic subsequently allows said transaction control logic to issue said read command followed by said write barrier command, and wherein said bus arbitration logic otherwise allows said transaction control logic to issue only one command over said address bus.

24. A method for controlling a read-modify-write transaction to an address in a bus slave device, the method comprising:

providing a write barrier command from a bus master device over an on-chip system bus to the bus slave device; and precluding execution of any other transaction to the address within the bus slave device in response to said write barrier command until completion of the read-modify-write transaction, while allowing execution of other transactions to other addresses within the bus slave device.

25. The method as recited in claim 24 wherein the write barrier command immediately follows provision of a read command to the address bus.

* * * * *

UNITED STATES PATENT AND TRADEMARK OFFICE
CERTIFICATE OF CORRECTION

PATENT NO. : 6,490,642 B1
DATED : December 3, 2002
INVENTOR(S) : Radhika Thekkath and G. Michael Uhler It is certified that error appears in the above-identified patent and that said Letters Patent is hereby corrected as shown below:

<u>Title page,</u>
Item [56], U.S. PATENT DOCUMENTS, add the following U.S. Patents:

```
-- 5,347,648   9/13/1994   Stamm et al.
   5,724,549   3/03/1998   Selgas et al.
   5,802,560   9/01/1998   Joseph et al.
   6,034,542   3/07/2000   Ridgeway --
```

Signed and Sealed this

Twentieth Day of May, 2003

JAMES E. ROGAN
*Director of the United States Patent and Trademark Office*